(12) United States Patent
Dahl et al.

(10) Patent No.: US 12,256,111 B2
(45) Date of Patent: *Mar. 18, 2025

(54) METHOD FOR AUDIO AND VIDEO JUST-IN-TIME TRANSCODING

(71) Applicant: Mux, Inc., San Francisco, CA (US)

(72) Inventors: Jon Dahl, San Francisco, CA (US); Adam Brown, San Francisco, CA (US); Nick Chadwick, San Francisco, CA (US); Matt Ward, San Francisco, CA (US); Scott Kidder, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,813

(22) Filed: Apr. 6, 2023

(65) Prior Publication Data
US 2023/0247239 A1 Aug. 3, 2023

Related U.S. Application Data

(63) Continuation of application No. 16/458,630, filed on Jul. 1, 2019, now Pat. No. 11,653,040.
(Continued)

(51) Int. Cl.
*H04N 7/16* (2011.01)
*H04N 19/136* (2014.01)
(Continued)

(52) U.S. Cl.
CPC ... *H04N 21/234309* (2013.01); *H04N 19/136* (2014.11); *H04N 19/40* (2014.11);
(Continued)

(58) Field of Classification Search
CPC ......... H04N 21/234309; H04N 19/136; H04N 19/40; H04N 19/59; H04N 21/2187;
(Continued)

(56) References Cited

U.S. PATENT DOCUMENTS 11,533,521 B2 * 12/2022 He .................. H04N 21/8456
2014/0317234 A1 * 10/2014 Mueller ................ H04L 47/10
709/217

(Continued)

*Primary Examiner* — Annan Q Shang
(74) *Attorney, Agent, or Firm* — Run8 Patent Group, LLC; Peter Miller; Brian T. Chew

(57) ABSTRACT

A method for streaming an audio-video file can include: receiving a request for a playback segment of the audio-video file in a rendition from a computational device; in response to identifying absence of the playback segment in the rendition from a rendition cache and identifying absence of an assignment to transcode the playback segment in the rendition: assigning a worker to transcode the playback segment in the rendition. The method can also include, at the worker: identifying a subset of mezzanine segments in the set of mezzanine segments coinciding with a playback interval in the audio-video file; and for each mezzanine segment in the subset of mezzanine segments: concurrently transcoding the mezzanine segment into a rendition segment in the rendition and transmitting the rendition segment coinciding with the playback interval to the computational device via a peer-to-peer stream; and storing the rendition segment in the rendition cache.

20 Claims, 4 Drawing Sheets

Related U.S. Application Data

(60) Provisional application No. 62/694,408, filed on Jul. 5, 2018.

(51) Int. Cl.
| | | |
|---|---|---|
| *H04N 19/40* | (2014.01) | |
| *H04N 19/59* | (2014.01) | |
| *H04N 21/2187* | (2011.01) | |
| *H04N 21/231* | (2011.01) | |
| *H04N 21/2343* | (2011.01) | |
| *H04N 21/239* | (2011.01) | |
| *H04N 21/24* | (2011.01) | |
| *H04N 21/845* | (2011.01) | |

(52) U.S. Cl.
CPC ......... *H04N 19/59* (2014.11); *H04N 21/2187* (2013.01); *H04N 21/23106* (2013.01); *H04N 21/2393* (2013.01); *H04N 21/2407* (2013.01); *H04N 21/8456* (2013.01)

(58) Field of Classification Search
CPC ......... H04N 21/23106; H04N 21/2393; H04N 21/2407; H04N 21/8456; H04N 19/436; H04N 21/632; H04N 21/8455
See application file for complete search history.

(56) References Cited

U.S. PATENT DOCUMENTS

| | | | | |
|---|---|---|---|---|
| 2015/0085875 | A1* | 3/2015 | Phillips | H04N 21/2402 370/465 |
| 2016/0065995 | A1* | 3/2016 | Phillips | H04N 21/25841 725/62 |
| 2016/0360208 | A1* | 12/2016 | Perlman | H04N 19/436 |
| 2017/0180800 | A1* | 6/2017 | Mayrand | G06F 3/005 |
| 2019/0098343 | A1* | 3/2019 | Knecht | H04N 21/8456 |
| 2019/0149859 | A1* | 5/2019 | George | H04N 21/8547 725/148 |
| 2020/0304849 | A1* | 9/2020 | Hassler | H04N 21/84 |

* cited by examiner

METHOD FOR AUDIO AND VIDEO JUST-IN-TIME TRANSCODING

CROSS-REFERENCE TO RELATED APPLICATIONS

This application is a continuation of U.S. patent application Ser. No. 16/458,630, filed on 1 Jul. 2019, which claims the benefit of U.S. Provisional Application No. 62/694,408, filed on 5 Jul. 2018, which is incorporated in its entirety by this reference.

TECHNICAL FIELD

This invention relates generally to the field of audio and video transcoding and more specifically to a new and useful method for just-in-time transcoding in the field of audio and video transcoding.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
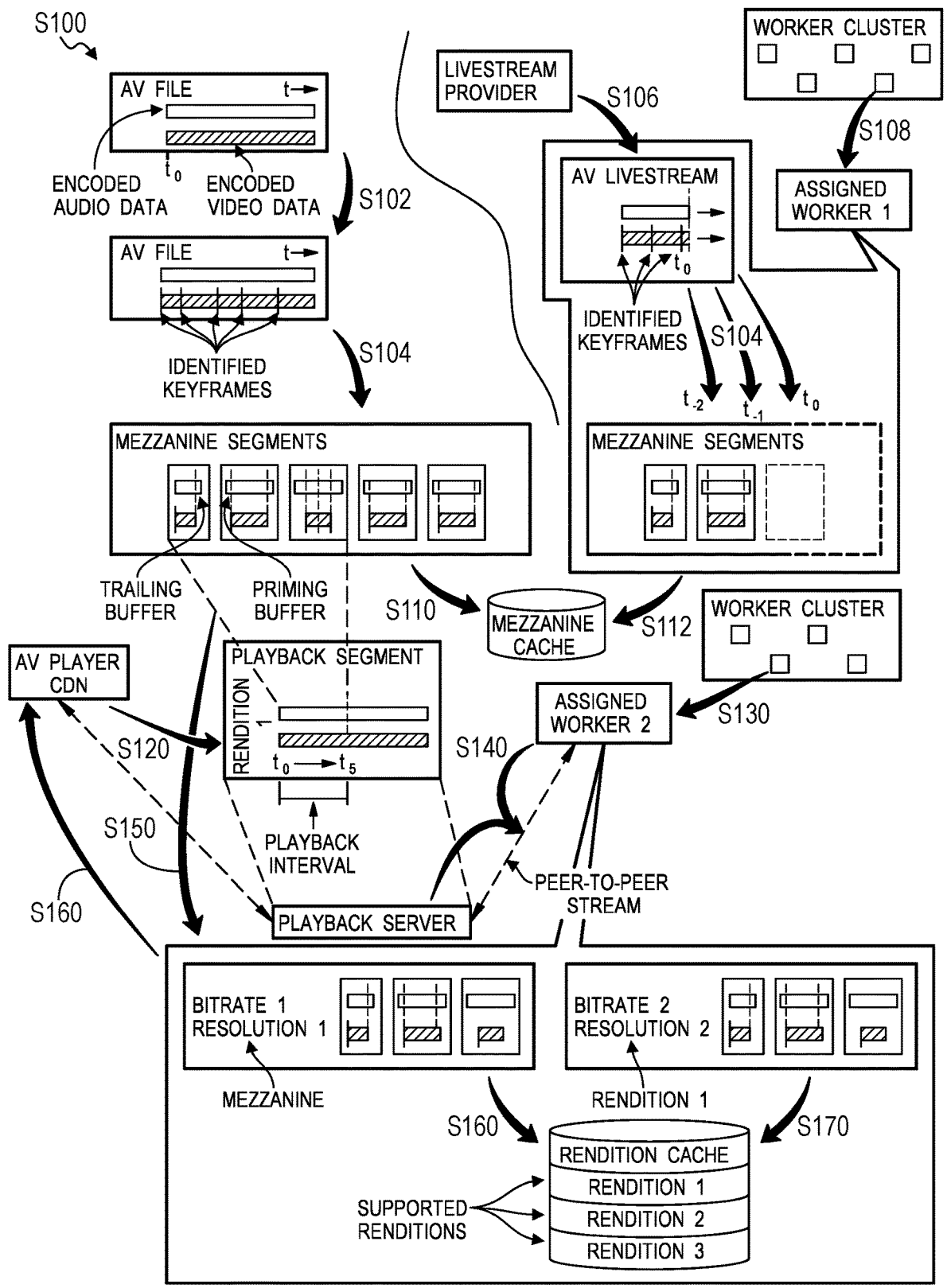
FIG. 1 is a flowchart representation of a method.

As shown in FIG. 1, a method S100 for streaming an audio-video file includes: storing a set of mezzanine segments of the audio-video file, each mezzanine segment in the set of mezzanine segments including a portion of the audio-video file beginning at an initial keyframe in the audio-video file and terminating at a terminal keyframe in the audio-video file in Block S110; receiving a first request for a first playback segment of the audio-video file in a first rendition from a first computational device, the first playback segment defining a first playback interval in the audio-video file in Block S120. The method S100 also includes, in response to identifying absence of the first playback segment in the first rendition from a rendition cache and identifying an absence of an assignment to transcode the first playback segment in the first rendition: assigning a first worker to transcode the first playback segment in the first rendition in Block S130; and initiating a first stream between the first worker and the first computational device in Block S140. The method S100 further includes, at the first worker: identifying a first consecutive subset of mezzanine segments in the set of mezzanine segments coinciding with the first playback interval in the audio-video file in Block S150. The method additionally includes, for each mezzanine segment in the consecutive subset of mezzanine segments: concurrently transcoding the mezzanine segment into a rendition segment in the first rendition and transmitting the rendition segment coinciding with the first playback interval to the first computational device via the first stream in Block S160; and, in response to completely transcoding the rendition segment in the first rendition, storing the rendition segment in the rendition cache in Block S170.

One variation of the method S100 includes: identifying a set of keyframe timestamps corresponding to keyframes in the audio-video file in Block S102; segmenting the audio-video file to define a set of mezzanine segments, each mezzanine segment including a portion of the audio-video file within a keyframe interval beginning at an initial keyframe timestamp in the set of keyframe timestamps and terminating at a terminal keyframe timestamp in the set of keyframe timestamps in Block S104; storing the set of mezzanine segments as a mezzanine encoding of the audio-video file in Block S110; publishing a stream for the audio-video file to a first audio-video player instance, the stream indicating availability of a supported rendition of the audio-video file; and receiving a first request from the first audio-video player instance for a playback segment of the audio-video file in the supported rendition, the playback segment defining a playback interval in Block S120. This variation of the method S100 also includes, in response to identifying absence of the playback segment in the supported rendition from a rendition cache and identifying absence of an assignment to transcode the playback segment into the supported rendition: identifying a consecutive subset of mezzanine segments in the set of mezzanine segments, each mezzanine segment in the subset of mezzanine segments defining a keyframe interval coinciding with the playback interval in the audio-video file in Block S150. This variation of the method S100 further includes, for each mezzanine segment in the consecutive subset of mezzanine segments: concurrently transcoding the mezzanine segment into a rendition segment in the supported rendition and transmitting the rendition segment coinciding with the playback interval to the first audio-video player instance in Block S160; and, in response to completely transcoding the rendition segment in the supported rendition, storing the rendition segment in the rendition cache in Block S170.

Another variation of the method S100 includes: receiving the audio-video file as a livestream including a stream of audio-video data in Block S106; and assigning a first worker to cache the stream of audio-video data in Block S108. This variation of the method S100 also includes, at the first worker, for a duration of the livestream: segmenting the stream of audio-video data as a set of mezzanine segments, each mezzanine segment in the set of mezzanine segments including a portion of the stream of audio-video data beginning at an initial keyframe and terminating at a terminal keyframe in Block S104; and caching the set of mezzanine segments in a mezzanine cache in Block S112. This variation of the method S100 further includes: receiving a request, from a first computational device, for a first playback segment of the livestream in a first rendition, the first playback segment defining a first playback interval in the livestream in Block S120. This variation of the method S100 additionally includes, in response to identifying absence of the first playback segment in the first rendition in a rendition cache and identifying absence of an assignment to transcode the first playback segment into the first rendition: assigning a second worker to transcode the first playback segment in the first rendition in Block S130; and initiating a first stream between the second worker and the first computational device in Block S140. This variation of the method S100 also includes, at the second worker: accessing the set of mezzanine segments from the mezzanine cache; and identifying a first consecutive subset of mezzanine segments in the set of mezzanine segments coinciding with the first playback interval in the livestream in Block S150. This variation of the method S100 further includes, for each mezzanine segment in the consecutive subset of mezzanine segments: concurrently transcoding the mezzanine segment into a rendition segment in the first rendition and transmitting the rendition segment coinciding with the first playback interval to the first computational device via the first stream in Block S160; and, in response to completely transcoding the rendition segment, storing the rendition segment in the rendition cache in Block S170.

2. Applications

Generally, a computer system (e.g., a server, a computer network) can execute Blocks of the method S100 to: ingest a new audio-video file (hereinafter the "AV file"); publish a stream (e.g., an HLS stream) advertising renditions of the AV file prior to transcoding these renditions; in response to receiving a request to stream the AV file, concurrently transcode and stream rendition segments of the AV file; store these rendition segments in memory; serve these stored rendition segments when requested at later times; and repeat this process to populate a rendition cache with advertised renditions of the AV file responsive to first requests for these rendition segments.

In particular, the computer system executes Blocks of method to: receive and normalize an AV file into a supported encoding and container format; identify keyframes in the AV file; segments the AV file based on the keyframes to create mezzanine segments for each AV file; and publish the stream to instances of AV players on multiple devices (e.g., by generating a manifest file). When the computer system receives a request for a playback segment from an instance of an AV player, the computer system: maps the playback segment to coincident rendition segments; and identifies whether mezzanine segments corresponding to the coincident rendition segments were previously transcoded and stored in memory (e.g., in a database, a rendition cache) or are currently queued for transcoding in the requested rendition. If the mezzanine segments were previously transcoded into corresponding rendition segments and stored in a rendition cache, the computer system then clips the corresponding rendition segment to create the requested playback segment and returns the requested playback segment to the instance of the AV player. However, if the computer system has not yet transcoded the rendition segments, the computer system initiates a just-in-time transcoding process to: concurrently transcode the corresponding mezzanine segment into a coincident rendition segment; stream the playback segment including the coincident rendition segment to the requesting instance of an AV player; and store the rendition segment in the rendition cache for future distribution.

Therefore, the computer system can compile a full set of transcoded rendition segments for the AV file, wherein each rendition segment is transcoded in (near) real-time following a first request for this rendition segment from an AV player instance after—rather than before—the AV file is published for streaming. Thus, the computer system can greatly reduce the time-to-publication of an AV file. Additionally, the computer system can reduce the immediate computational requirements for transcoding an AV file into a number of advertised renditions in a short period of time (i.e. before publishing the stream of the AV file) and can instead spread this computational load over a longer period of time. Furthermore, by transcoding rendition segments of the AV file on-demand, the computer system can conserve storage space for the time period before each rendition segment is requested for the first time. The method S100 can also enable dynamic switching of renditions advertised at a stream of the AV file without interruption of the stream thereby allowing for improved customization of rendition ladders for particular AV files and/or viewing conditions.

In one example, the computer system can improve storage utilization in a rendition cache by recording viewing data for each AV file categorized by requested rendition and by segment. Then, based on the viewing data, the computer system can selectively delete rendition segments to reduce the memory footprint of the AV file and corresponding renditions of the AV file for infrequently requested segments, and re-transcode the deleted segments upon receiving a request. Additionally or alternatively, the computer system can selectively transcode segments in advance (e.g. the first segment in each rendition) to optimize streaming performance in the majority of viewing cases while saving the computational time of transcoding the entire rendition.

In order to transcode and stream a rendition of an AV file in (near) real-time (e.g., within 500 milliseconds), the computer system segments the AV file based on keyframe timestamps in the AV file to generate a set of mezzanine segments, which the computer system stores in the mezzanine cache. Therefore, the computer system ensures that each segment is individually addressable and can be individually stored, transcoded, and streamed, which enables more efficient uses of computational resources—such as server processing power and storage time—by facilitating distribution of those computational resources over time.

The computer system can include or interface with: a playback server; a storage layer abstraction (hereinafter "the storage manager"); a scheduler; a transcoding resource cluster (hereinafter "the worker cluster"); and/or other computational components to queue or execute Blocks of the method S100. For example, the playback server can receive requests for particular playback segments and request access to rendition segments coinciding with the playback segments in the AV file via the storage manager. In this example, the storage manager can direct the playback server to the location of a cached rendition segment, initiate a peer-to-peer stream between a worker (in the worker cluster) already transcoding the rendition segment and the playback server, and/or prompt the scheduler to assign a worker to transcode the rendition segments coinciding with the playback segment.

2.1 Variations

In one variation of the method S100, the computer system can reduce latency and computational load for live streaming applications by transcoding portions of a livestream or various offered renditions of the livestream on-demand via the just-in-time encoding process rather than automatically transcoding the livestream into all offered renditions before any AV players request to view the livestream.

In another variation of the method S100, the computer system can produce video thumbnails or thumbnail images by selectively decoding AV segments that contain the video frames that include the thumbnail. For example, a video thumbnail can be displayed shortly after publication of the video by specifying a time interval for the video thumbnail and selectively transcoding the segments corresponding to the video thumbnail in each rendition offered by the computer system immediately after publication. Therefore, the computer system can improve the publishing time for thumbnails of the AV file.

In a yet another variation of the method S100, the computer system can integrate advertisements or any other AV content within an AV stream. Advertisements may be served during a streaming video at a different resolution, bitrate, and possibly a different aspect ratio when compared to the streaming video. Furthermore, AV players may pause the original stream in order to display an advertisement served by a separate computer system than the computer system serving the original AV stream. However, when executing the method S100, the computer system ingests and just-in-time transcodes an advertisement selected for an AV stream to the same rendition of the original stream such that the advertisement can be seamlessly integrated into the stream.

In another variation of the method S100, the computer system can serve view-specific watermarks for a video. For example, rather than performing a just-in-time transcoding of the mezzanine segment, the segment can watermark the AV segment during the transcoding process such that the watermark can be displayed in the requested rendition of the AV file.

Another variation of the method S100 includes: transmuxing received AV files into a supported audio or video encoding or transmuxing them into a supported container format; selectively transcoding particular segments to reduce the keyframe interval within those segments; selectively remuxing particular segments to normalize timestamps within those segments; adding encoded audio data buffers (e.g. priming or trailing buffers) on either or both ends of the encoded video data for each segment to reduce edge encoding effects in the rendition segment; concurrently transcoding a rendition segment and streaming a playback segment from the rendition segment on a per segment basis; transcoding a rendition segment into a temporary data buffer rather than a rendition cache for one time presentation of the stream; and transcoding rendition segments corresponding to subsequent playback segments in parallel with the rendition segments corresponding to the request playback segment.

2.2 Terms

Generally, the term "stream," as used herein, refers to a bitstream of encoded audio, video, or any other data between two devices or computational entities executing on devices (e.g., AV players executing on a mobile computing devices) such as an HLS, HDS, or MPEG-DASH stream. Therefore, the computer system can initiate streams between servers in the computer system, between the computer system and a content delivery network (hereinafter "a CDN"), or between the computer system and any other computational device.

Generally, the term "segment," as used herein, refers to a series of encoded audio and/or encoded video data corresponding to a particular time interval or consecutive series of frames in an AV file or AV stream.

Generally, the term "mezzanine," as used herein, refers to the highest quality (e.g., high bitrate and high resolution) encoding (i.e. a bitrate resolution pair) of an AV file cached by the computer system that derives from the original version of the AV file uploaded to the computer system. Therefore, a "mezzanine segment" refers to a segment of an AV file encoded at the highest quality encoding for the AV file.

Generally, the term "rendition" refers to any encoding of an AV file that is indicated in the rendition manifest or manifest file (e.g., an HLS manifest) for a stream of the AV file. Therefore, a "rendition segment" refers to a segment of the AV file that has been transcoded at a bitrate and/or resolution different from the mezzanine segment. The computer system can transcode any mezzanine segment into multiple corresponding rendition segments in various renditions representing the same time interval in the AV file at differing bitrates and resolutions.

Generally, the term "playback segment" refers to a segment requested by a CDN or directly from an AV player specifying a time interval in the AV file and a rendition of the AV file to be served by the computer system. Therefore, a playback segment coincides or is coincident with a mezzanine segment or rendition segment if a time interval defined by the playback segment temporally overlaps with the mezzanine segment or rendition segment in the AV file respectively. Additionally or alternatively, the AV player or CDN can request a playback segment by specifying an index (e.g., a segment number) of a total number of playback segments in the AV file (e.g., based on a playback segment duration). Therefore, the computer system can calculate a playback interval by in the AV file based on the index of the requested playback segment and a known (or specified) playback segment duration (e.g., 5 seconds).

Generally, the computer system can interface directly with an AV player instance on a local computing device. Alternatively, the computer system can serve a stream of the AV file to a content delivery network (hereinafter "CDN"), which can relay the stream of the AV file to the AV player instance. For ease of explanation, any discussion herein of requests by an AV player instance are also applicable to requests by CDNs.

3. Content Ingest and Normalization

As shown in FIG. 1, the computer system stores an AV file in order to prepare the original encoding of the AV file for streaming. Generally, the computer system temporarily stores received AV files in order to analyze and prepare the AV file for steps of the method S100.

In one implementation, once the computer system normalizes the AV file and stores the normalized AV file in a mezzanine format (e.g., a normalized original or root format from which other versions of the AV file are transcoded), the computer system can delete the original ingested AV file. In one implementation, the method S100 can include receiving an HTTP post request to upload the file to the computer system executing the method S100. Additionally or alternatively, the computer system can receive a URL specifying the current storage location of the AV file via an HTTP post and the system can download the AV file from the current storage location of the AV file. However, computer system can store the AV file in any other way.

Before performing keyframe identification, as shown in FIG. 1B, the computer system can normalize AV files by: identifying keyframe timestamps in the AV file in Block S102; and segmenting the AV file into a set of mezzanine segments according to the identified keyframe timestamps in Block S104. The computer system can also selectively transcode, transmux, or remux an ingested AV file, depending on the characteristics of the AV file, in order to prepare the ingested AV file for segmentation. For example, the computer system can transcode, transmux, or remux the ingested AV file based on the audio codec and video codec of the encoded audio data and the encoded video data respectively, as well the container format used to store the encoded audio data and the encoded video data. In one implementation, the computer system can ingest multiple codecs and container formats. In some implementations, the computer system normalizes AV files to a preferred audio codec(s), video codec(s), and/or container format(s). In one example, the computer system normalizes to the AAC audio codec, the H.264 video codec, and the MPEG-TS container format.

In one implementation, the computer system detects the audio codec, video codec, and container format of the received AV file. If the detected container format differs from the preferred container format, the computer system can transmux the ingested AV file into the preferred container format. Additionally or alternatively, if the detected audio or video codec for the encoding of the audio and video data of the AV file differs from the preferred audio or video codec, the computer system can transcode the encoded audio data and/or the encoded video data using the preferred codec.

3.1 Transcoding

In one implementation, the computer system transcodes the ingested AV file into a preferred audio encoding and/or video encoding. If only the audio encoding of the ingested AV file differs from the preferred audio encoding, the computer system can transcode only the encoded audio data of the AV file. If only the video encoding of the ingested AV file differs from the preferred video encoding, the computer system can transcode only the encoded video data of the AV file. If both the audio and video encodings differ from the preferred audio and video encodings, the computer system can transcode the encoded audio data and the encoded video data.

The computer system can execute a variety of common decoders in order to transcode ingested encoded data into a preferred encoding. In one implementation, the computer system can encode the decoded ingested data losslessly and at a high quality in order to preserve the original AV file in a new encoding. Additionally or alternatively, the computer system can satisfy the minimum and maximum keyframe intervals discussed below when transcoding the encoded video data of the AV file.

Additionally, the computer system can transcode the ingested AV file based on characteristics of the encoded audio data or the encoded video data of the AV file. For example, if the bitrate of the encoded data is above a threshold bitrate the encoded data can be transcoded to a lower bitrate. Furthermore, the system can initiate transcoding based on threshold values of other parameters, such as resolution and maximum keyframe interval.

The computer system can serve AV files including encoded audio data and encoded video data stored in any multimedia container format. The computer system can also ingest AV files including encoded audio data and encoded video data encoded according to any supported codec and in any resolution, aspect ratio, frame rate, or audio sampling rate supported by those codecs.

3.2 Transmuxing

In one implementation, the computer system performing the method S100 transmuxes the ingested AV file into a preferred container format, if the container format of the ingested AV file differs from a preferred container format. The method S100 can include the transmuxing step in addition to the transcoding step, if both the audio and/or video encodings and the container format of the ingested AV file differ from the preferred audio and/or video encoding and container respectively. The computer system can include a variety of common demuxers in order to transmux the ingested AV file into a preferred container format. In one implementation, the computer system performs the same timestamp normalization discussed below with respect to timestamp remuxing while transmuxing an ingested AV file.

3.3 Timestamp Remuxing

In one implementation, the computer system normalizes the timestamps provided by the container format of the AV file. The computer system can normalize timestamps of the received AV file even if the ingested AV file is already in the preferred container format. By thus normalizing the timestamps, the computer system can reduce audio transcoding artifacts and desynchronization between audio and video content when the computer system later transcodes this content in Block S160 described below.

Depending on the original encodings of the audio and video data, and the original container format of the ingested AV file, initial timestamps corresponding to the initial frames of audio and video data may be represented as being before the start time of the AV file (e.g. negative timestamps). Alternatively, the initial timestamps of the ingested AV file may be arbitrarily delayed relative to the start time of the AV file, such as due to the insertion of priming samples or encoder delay inherent in many audio codecs.

Additionally, most container formats only specify the occurrence of timestamps at a minimum frequency within the stream, thereby relying on the AV player to properly synchronize audio and video frames in-between timestamps. In essence, there is no guarantee that timestamps will be present in the ingested AV file at the points at which the encoded audio data and the encoded video data will be segmented into separate files. Without prior timestamp normalization, audio frames that are not synchronized with video frames may be included in the same segment upon segmentation by the computer system.

The computer system remuxes the ingested AV file in the preferred container format to resolve inconsistencies amongst ingested AV files in priming sample timestamps, timestamp frequency and timestamps at keyframe locations in the ingested AV file. In one implementation, the computer system remuxes to delete any empty or null audio frames and adds a timestamp of time zero at the first priming sample required by the audio codec. The computer system can then offset the timestamps of the video frames from time zero by the duration of the priming samples or audio encoding delay. For example, if the AV file is stored using the MPEG-TS container format and MPEG-TS is one of the preferred container formats of the computer system, the computer system can shift the presentation timestamps of the audio frames such that the first priming samples are decoded at time zero, while also shifting the presentation timestamps of the video frames so they are offset from time zero by the audio encoding delay.

In one implementation, the computer system remuxes the ingested AV file to increase the frequency of timestamps for frames in the AV file. For example, the computer system can add timestamps to each audio frame in order to precisely identify which audio frames are to be decoded and presented with each video frame at the AV player. In another implementation, the computer system remuxes the AV file to include timestamps at the keyframes or "intra-frames" of the AV file. However, the computer system can normalize the timestamps of an AV file in any other way that facilitates AV file segmentation.

4. Keyframe Identification

As shown in FIG. 1 in Block S102, the computer system identifies a set of keyframe timestamps corresponding to keyframes in the encoded video data.

Generally, the computer system identifies keyframes as potential segmentation points in the AV file thereby enabling the computer system to decode each segment based on an initial keyframe in the segment without first transcoding prior encoded video data outside of the segment. In one implementation, the computer system identifies keyframes based on header information for each encoded video frame in the video encoding. For example, in an H.264 encoding, keyframes are encoded as "I-frames" or more specifically as Instantaneous Decoder Refresh (hereinafter IDR) frames. Therefore, the computer system scans the encoded video data of the AV file to identify IDR frames, and subsequently determines a timestamp from the container format associated with the IDR frame. However, the computer system can execute an equivalent process for identifying keyframe timestamps for any encoding or container format.

4.1 Maximum Keyframe Intervals

To ensure efficient segmentation of the AV file, the computer system executing the method S100 can calculate a keyframe interval between each pair of consecutive keyframes in the encoded video data of the AV file and compare the calculated keyframe interval to a maximum keyframe interval. Then, in response to any of the calculated keyframe intervals exceeding the maximum keyframe interval, the computer system can re-encode the encoded video data of the AV file to insert additional keyframes and generate a re-encoded AV file. Therefore, in the re-encoded AV file, the computer system can ensure that each keyframe interval in the re-encoded AV file is less than the maximum keyframe interval. Generally, the computer system calculates the keyframe interval in an AV file by determining the time between consecutive keyframes in the encoded video data of the AV file. For example, in H.264 encoded video data a keyframe interval would be the time between consecutive IDR frames. If the computer system utilizes a relatively long maximum keyframe interval, the largest segments may take extra computational time to encode and are more likely to only minimally overlap with a playback segment when compared to a preferable maximum keyframe interval. Alternatively, if the computer system utilizes a relatively short maximum keyframe interval, the computer system may perform more transcoding before segmentation and may use more computational time in retrieving multiple segments from memory since more segments may coincide with a playback segment of the same length when compared to a preferable maximum keyframe interval. Thus, the maximum keyframe interval may be set at a value that balances the above described effects based on the relative costs of upfront transcoding time, rendition transcoding time, and storage time. In one implementation, the computer system utilizes a maximum keyframe interval of ten seconds.

Alternatively, the computer system re-encodes the encoded video data if the average keyframe interval is above a threshold average keyframe interval. The computer system can also compare any other statistic based on keyframe interval length to a threshold value of that statistic and re-encode the received AV file based on that comparison. However, the computer system can limit keyframe intervals in any other way.

In one implementation, the computer system can calculate a maximum keyframe interval for an AV file by: identifying a bitrate of the AV file, a resolution of the AV file, and/or a video codec of the AV file; and calculating a maximum keyframe interval as a function of the bitrate, the resolution, and/or the video codec of the AV file. The maximum keyframe interval function can define a shorter maximum keyframe interval for higher-resolution and higher-bitrate AV files or AV files encoded with a high complexity codec in order to reduce the computational costs of retrieving and transcoding the these more memory-intensive segments. Correspondingly, the maximum keyframe interval function can define a longer maximum keyframe interval for lower-resolution and lower-bitrate AV files or AV files encoded with a low complexity codec.

4.2 Selective Reencoding

Upon an identification that a keyframe interval exceeds a maximum keyframe interval, the computer system can selectively re-encode the identified keyframe interval before segmentation. For example, if the maximum keyframe interval is 20 seconds and keyframe intervals of 40 seconds and 120 seconds are identified in the encoded video data, the method S100 can include reencoding only the 40 second and 120 second chunks of the identified intervals of the encoded video data to place more frequent keyframes. The computer system can selectively re-encode the encoded video data at keyframe intervals longer than the maximum keyframe interval and insert keyframes such that no keyframe intervals exceed the maximum in the re-encoded AV file. Additionally, the computer system can selectively re-encode keyframe intervals for any other reason.

5. Segmentation

As shown in FIG. 1, the computer system can: access a normalized AV file and segment the AV file into a set of mezzanine segments in Block S104, wherein each mezzanine segment in the set of mezzanine segments includes: a segment of encoded video data beginning at an initial keyframe timestamp and terminating at a terminal keyframe timestamp; a segment of encoded audio data beginning at the initial keyframe timestamp and terminating at the terminal keyframe timestamp; a priming audio data buffer beginning at a priming timestamp preceding the first keyframe timestamp by a priming buffer duration and terminating at the initial keyframe timestamp; and a trailing audio data buffer beginning at the terminal keyframe timestamp and terminating at the trailing timestamp delayed from the terminal keyframe timestamp by a trailing buffer duration.

Generally, the computer system segments the ingested and normalized AV file, such that each mezzanine segment of encoded video and audio data can be just-in-time transcoded into a corresponding rendition segment when requested by an AV player or CDN. By segmenting the encoded video data at keyframes in the encoded video data, the computer system ensures that each segment can be individually transcoded without relying on video frames outside of the segment. More specifically, each mezzanine segment includes encoded video data that begins with a keyframe and ends with the frame immediately before the second keyframe. Therefore, each segment in the set of mezzanine segments includes a consecutive set of video frames of the AV file beginning with and including the initial keyframe and terminating immediately prior to (i.e. not including) a terminal keyframe. However, due to the overlapping and frequency-encoded nature of audio samples in most encodings of audio data, the computer system can segment an additional priming buffer and a trailing buffer of the encoded audio data. For example, the computer system can include 200 milliseconds of encoded audio data both before and after the keyframes that form the boundaries of a particular segment of the encoded video data, thereby creating a segment with 400 milliseconds more encoded audio data than encoded video data. The computer system includes a priming buffer and/or trailing buffer of encoded audio data in each mezzanine segment to prevent edge encoding effects from occurring when the computer system transcodes mezzanine segment into a rendition segment prior to streaming. Alternatively, the computer system can store audio data segments characterized by the same length as the encoded video data segments and reference adjacent audio segments when transcoding a mezzanine segment into a new rendition such that the computer system can offer the mezzanine segments as a playable rendition of the AV file.

In one implementation, the computer system generates mezzanine segments that each include a segment of encoded audio data, a segment of encoded video data, a start time and duration and/or end time of the segment, and a sequence number of the segment such that each mezzanine segment is individually addressable and can be retrieved and transcoded individually from the mezzanine cache.

In one implementation, the computer system implements a minimum segment length in order to create segments at keyframes greater than the minimum segment length apart. For example, if the minimum segment length is two seconds, the computer system segments the AV file at keyframes at least two seconds apart. Therefore, in this implementation, the computer system can define segment boundaries at keyframes, but the resulting mezzanine segments can include additional keyframes in between the boundary keyframes.

In one implementation, the computer system stores the mezzanine segments in a mezzanine cache. The mezzanine cache stores the mezzanine (e.g. the normalized original AV file) in mezzanine segments, which can then be transcoded into rendition segments. In one implementation, the mezzanine version of the ingested AV file, stored in the mezzanine cache, can be offered as a rendition version if the ingested version of the AV file is satisfactory for streaming. In implementations in which the computer system includes a priming buffer and/or trailing buffer in the encoded audio data of the AV segment, these buffer sections of the audio are removed during playback or re-encoded as a shorter segment.

6. Livestream Ingest, Normalization, and Segmentation

Generally, the computer system can execute Blocks of the method S100 to ingest AV livestreams in addition to AV files of a predetermined length (i.e. file size). More specifically, the computer system can: receive the audio-video file as a livestream including a stream of audio-video data in Block S106; and assign a first worker to cache the stream of audio-video data in Block S108. The computer system (via the worker) can then segment the stream of audio-video data as a set of mezzanine segments, each mezzanine segment in the set of mezzanine segments including a portion of the stream of audio-video data beginning at an initial keyframe and terminating at a terminal keyframe in Block S104; and caching the set of mezzanine segments in a mezzanine cache in Block S112. Therefore, for the duration of a livestream, the system can identify keyframes in the livestream and cache mezzanine segments for later transcoding. By delaying transcoding of the livestream to a set of supported renditions the computer system can avoid transcoding a livestream into multiple extraneous renditions before the livestream is viewed at an AV player in a supported rendition. Therefore, while caching mezzanine segments for a livestream, the system can execute any of the abovementioned evaluations and, in response, remux, transmux, and/or transcode the livestream such that the mezzanine segments of the livestream are in the preferred format and encoding for subsequent transcoding into rendition segments via the just-in-time transcoding process.

7. Rendition Manifest

As shown in FIG. 1, the computer system publishes a stream for the audio-video file to an audio-video player. Upon storing the segmented mezzanine version of the ingested AV file in the mezzanine cache, or other suitable location, the computer system can publish a rendition manifest or manifest file (e.g. an HLS manifest) indicating the rendition encodings (i.e. bitrate-resolution pairs) in which the AV file is being offered and indicating a URL at which to request playable segments of the AV file. Thus, the computer system can: generate a manifest file indicating a set of renditions including the supported rendition; and transmit the manifest file to an AV player instance prior to transcoding the audio-video file in the supported rendition.

By executing the method S100, the computer system can just-in-time transcode individual mezzanine segments into specific rendition segments, thereby enabling the computer system to publish a stream of the AV file before performing any transcoding of the mezzanine segments of the AV file into the rendition segments advertised in the manifest file. The computer system can also dynamically update a previously published rendition manifest and transcode additional rendition versions of the mezzanine segments in response to changes in viewing behavior or viewing context of the AV file. In one implementation, the method S100 includes providing HLS .m3u8 manifests to instances of AV players on many devices, wherein the .m3u8 manifests indicate the resolution, aspect ratio, audio sample rate, audio encoding, and video encoding for a given bandwidth and screen size. However, the computer system can publish a stream of an AV file in any other way.

8. Rendition Cache

In one implementation, upon executing Blocks S160 and S170, the computer system can create a rendition cache and store rendition segments in the rendition cache. Each rendition segment in the rendition cache is temporally aligned with a corresponding mezzanine segment in the mezzanine cache and therefore has the same initial keyframe timestamp and terminal keyframe timestamp as its corresponding mezzanine segment. The rendition cache is organized in a database to mirror the mezzanine segments so that it can accept transcoded versions of each mezzanine segment of the AV file. In addition to specifying a location for each rendition segment corresponding to each mezzanine segment, the rendition cache also specifies a set of segment locations for each rendition in the rendition cache. Furthermore, the rendition cache can separate store audio rendition segments and video rendition segments such that the computer system can separately transcode, delete, or stream various bitrates and qualities for the audio data and video data of the same AV file. However, rendition segments corresponding to mezzanine segments can be stored in any way at the computer system.

9. Streaming System

Figure 3:
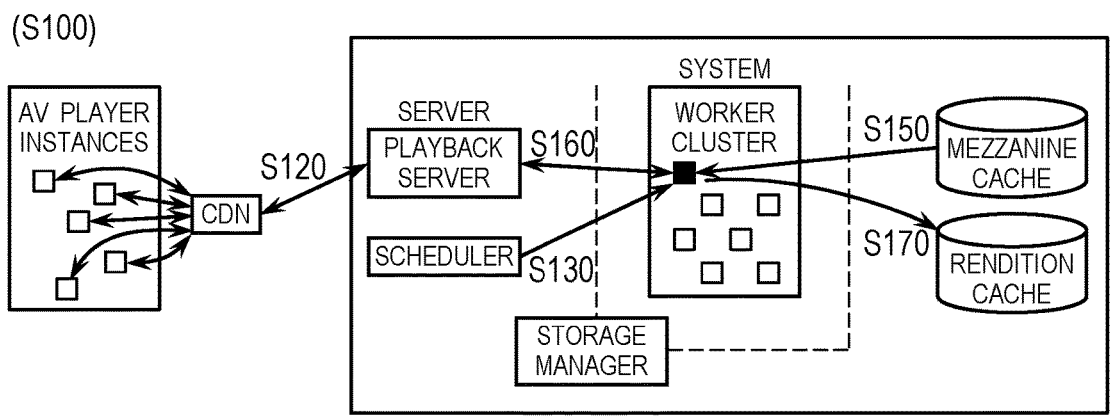
FIG. 3 is a schematic representation of one variation of the method.

As shown in FIG. 3, the computer system can include multiple servers executing various Blocks of the method S100. The computer system can leverage the architecture described herein in order to transcode and stream rendition versions of the AV file just-in-time (e.g., prior an adaptive bitrate encoder adapts to a lower bitrate in response to a slow response time from the computer system). Therefore, in one implementation, the computer system includes a playback server, a storage manager, a scheduler, and a worker cluster, thereby enabling efficient allocation of various Blocks of the method S100 to different computational entities within the computer system. However, the computer system can include additional or fewer computational components.

The playback server consolidates requests for playback segments from AV player instances and CDNs and, in response to receiving a request for a playback segment, queries the storage manager to identify the location of a set of rendition segments coinciding with the requested playback segment. The storage manager can then reply with a location of the set of rendition segments in the rendition cache or at a worker currently transcoding the rendition segments. Alternatively, the storage manager can direct the playback server to standby for the location of the requested set of rendition segments while the scheduler assigns a worker to transcode the rendition segment from a corresponding mezzanine segment. Upon identifying the location of the rendition segment from the storage manager, the playback server can also relay transcoded rendition segments to the request CDN or AV player instance as the requested playback segment. In one implementation, the playback server is implemented as a server cluster rather than a single server.

The storage manager is an abstraction layer separating the playback server from the rendition cache and worker cluster, which can just-in-time transcode. Therefore, upon receiving queries for the locations of particular rendition segments or mezzanine segments, the storage manager can provide the location of the queried segment regardless of its current status (e.g., either as a stream from a just-in-time transcode or directly from the rendition cache). In one implementation, the storage manager interacts with other entities in the computer system via RPC connections and can notify the playback server to standby before returning the location of a newly assigned worker that has been assigned by the scheduler to just-in-time transcode a set of rendition segments coinciding with a requested playback segment.

The scheduler can allocate and assign workers in the worker cluster to various tasks of the computer system. For example, the scheduler can assign workers to ingest AV files, cache and segment livestreams, transcode mezzanine segments into rendition segments, or any other computational function of the computer system. The scheduler can assign a worker to complete a task immediately or can allocate the worker to execute the task in the future (e.g., upon receiving a request or upon caching a particular mezzanine segment in the mezzanine cache). The scheduler can report identifying addresses for workers assigned or allocated for each task to the storage manager such that the storage manager can direct the playback server or other workers to the correct locations in the computer system. Additionally or alternatively, each worker can notify the storage manager of their own identifying address upon being assigned or allocated to transcode a mezzanine segment to a particular rendition segment such that the storage manager can direct the playback server to the workers' address and retrieve rendition segments being transcoded by the assigned worker.

The worker cluster can include a set of servers within the computer system that can be assigned to transcoding, caching, or any other Block of the method S100. Each worker in the worker cluster is individually addressable and is capable of concurrently transcoding a mezzanine segment to a rendition segment and streaming the rendition segment to the playback server or directly to a CDN or AV player via a peer-to-peer stream. Therefore, the computer system can coordinate a peer-to-peer stream with the playback server and any worker in the worker cluster. In one implementation, the worker can package transcoded chunks (e.g., 50 kilobyte chunks) of a rendition segment according to a standard transport protocol before streaming the rendition segment to the playback server. The worker can concurrently (e.g., in parallel or alternating in series) transcode a subsequent chunk of the rendition segment in preparation for streaming the subsequent chunk. Therefore, the worker can transcode and stream a rendition segment faster than real-time enabling just-in-time transcoding of request renditions of an AV file.

10. Streaming

As shown in FIG. 1 in Block S120, the computer system can receive a first request generated by the first AV player instance (or by a CDN) for a playback segment specifying a rendition and a playback interval. Generally, an AV player can utilize the rendition manifest and the provided URL to request a rendition of an AV file from the computer system. In one implementation, the computer system can receive and process an HTTP request conforming to the HLS standard.

Once the computer system receives the request for a playback segment, the method S100 includes identifying a consecutive subset of mezzanine segments in the set of mezzanine segments of the requested AV file with at least one of the initial keyframe timestamp and the terminal keyframe timestamp of each mezzanine segment in the subset of AV segments occurring within the playback interval of the requested playback segment. Generally, the computer system determines which of the mezzanine segments coincide with or temporally overlap (based on timestamps) with a requested playback segment in Block S150. Depending on the implementation, the computer system can execute Block S150 via the playback server, the storage manager, and/or workers assigned to transcode the requested playback segment.

In one implementation, the computer system compares the timestamps of the initial keyframe timestamp and the terminal keyframe timestamp of each mezzanine segment to the playback interval of the playback segment to identify mezzanine segments that overlap with the playback segment. If either the start or the end time of a mezzanine segment occurs between the start and end times of the playback segment, then the playback segment includes at least a portion of the mezzanine segment. In implementations in which the mezzanine segments are stored without priming or trailing audio buffers, the computer system can identify segments with starting times within a trailing buffer's duration of the end of the playback interval and/or segments with end times within a priming buffer's duration of the start time of the playback interval. In this implementation, the computer system ensures that a priming buffer and/or a trailing buffer are included for the playback segment.

However, the computer system can identify mezzanine segments coincident with the requested playback segment in any other way.

10.1 Streaming Logic

Figure 2:
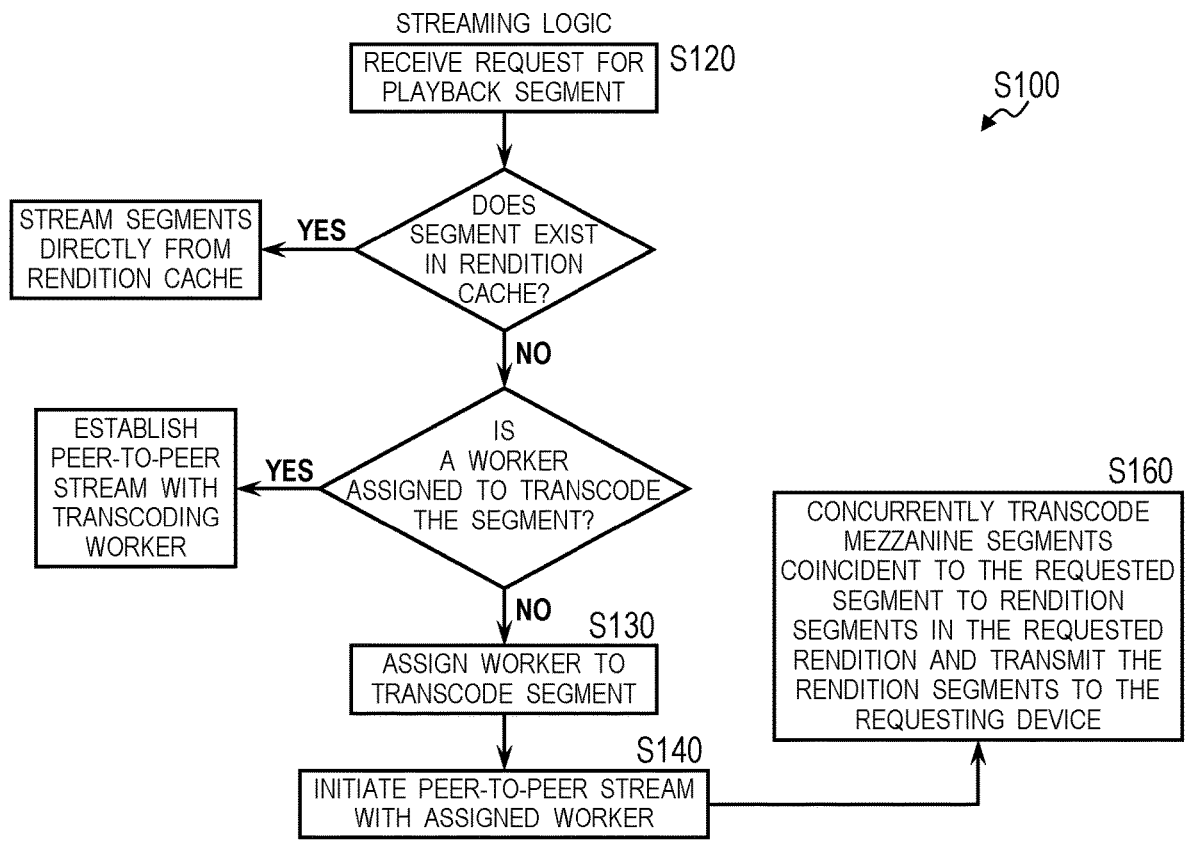
FIG. 2 is a flowchart representation of one variation of the method.

As shown in FIG. 2, the computer system can consolidate requests (via the playback server) received from AV players and/or CDNs according to the mezzanine segments coincident with the playback interval of each requested playback segment. Generally, the storage manager, executing streaming logic shown in FIG. 2 determines whether to stream a rendition segment corresponding to a requested playback segment directly from the rendition cache or from a worker currently transcoding the rendition segment based on whether the rendition segment already exists in the rendition cache, or whether it is currently being transcoded. The computer system evaluates streaming logic shown in FIG. 2. More specifically, the computer system can: query the storage manager for a consecutive set of rendition segments coinciding with a playback segment; evaluate whether the consecutive set of rendition segments are: a) stored in the rendition cache, b) currently transcoding at an assigned worker, or c) not assigned for transcoding.

In implementations wherein the computer system includes a rendition cache configured to store audio rendition segments separate from video rendition segments, the computer system can identify coincident audio rendition segments and video rendition segments for a requested playback segment. Therefore, the computer system can separately evaluate the status (as described above) of the coincident audio rendition segments and the coincident video rendition segments.

10.2 Just-in-Time Transcoding

If a requested rendition segment does not exist in the rendition cache (e.g., is absent from the rendition cache) and an assignment to transcode the requested rendition segment is absent, then the computer system initiates a just-in-time transcoding process to concurrently transcode a mezzanine segment into a rendition segment coincident with the playback segment and in the requested rendition of the playback request, in Block S160.

The computer system can assign a worker, in Block S130, to transcode the playback segment (e.g., by sequentially transcoding the consecutive coincident rendition segments); and initiates a peer-to-peer stream (e.g., via a chunked transfer encoding stream) between the worker and the playback server in Block S140. The playback server can then serve the streamed rendition segments to the requesting AV player instance or CDN. In one implementation, the playback server queries the storage manager to identify a location of a requested rendition segment. If the segment has not been assigned for transcoding and is not present in the rendition cache, the storage manager can prompt the playback server to standby until a worker is assigned to transcode the mezzanine segment to the rendition segment. Once the worker is assigned, the storage manager can provide an address of the assigned worker to the playback server and the playback server can initiate a peer-to-peer stream with the worker in order to access the rendition segment.

Generally, the computer system (e.g., a worker assigned to transcode the playback segment) includes a decoder and encoder that can transcode a mezzanine segment into a rendition segment in a requested rendition. For example, a mezzanine segment may be encoded using H.264 at 30 Mbps with AAC audio and 1280 by 720 resolution and a playback segment may be requested in H.264 at 15 Mbps with AAC audio and 640 by 480 resolution. In this case, the method S100 can include transcoding the mezzanine segment to a rendition segment using the H.264 codec.

In implementations in which the mezzanine segment includes an audio segment with a priming and/or a trailing buffer, the computer system decodes the audio segment including the priming and/or trailing buffer and encodes the rendition segment without the priming and/or trailing buffer. By decoding the entire audio segment including the priming and/or trailing buffer, the computer system reduces the likelihood of edge effects due to segmentation that may occur in the transcoded rendition segment when re-encoded as the rendition segment.

In implementations in which the mezzanine segment does not include an audio segment with a priming or a trailing buffer, the computer system identifies whether the time interval of the requested segment is within a priming buffer's duration of a preceding mezzanine segment boundary or within a trailing buffer's duration of a subsequent mezzanine segment boundary. If the preceding mezzanine segment ends within a priming buffer's duration of the time interval of the requested segment, the computer system decodes the audio segment of the preceding mezzanine segment and encodes the identified rendition segment based on the preceding decoded audio segment. If the subsequent mezzanine segment begins within a trailing buffer of the time interval of the requested segment, the computer system decodes the audio segment of the subsequent mezzanine segment and encodes the identified rendition segment based on the subsequent decoded audio segment.

The AV player instance, upon receiving streamed chunks (e.g., via an HLS stream), can render the video to a user at a computational device executing the AV player instance. In one implementation, the computer system can transcode a mezzanine segment and write the new rendition segment to the rendition cache on a chunk-by-chunk basis. The computer system can utilize the chunks and their accompanying timestamps to determine which chunks to include in the stream of the requested playback segment. Thus, the computer system can simultaneously write transcoded chunks of the rendition segment to the rendition cache while reading chunks of the rendition segment coincident with the playback segment. The computer system can then transmit the rendition AV chunkss to the requesting AV player instance for playback.

In one implementation, once the assigned worker has transcoded the identified mezzanine segments into corresponding rendition segments in the requested rendition, the worker can proceed to store the completed rendition segments in the rendition cache in Block S170. More specifically, the worker can: for each transcoded audio-video chunk in the stream of audio-video chunks, responsive to identifying that the transcoded audio-video chunk includes a chunk timestamp between the first keyframe timestamp and the second keyframe timestamp, store the transcoded AV chunk in the rendition cache as a rendition AV chunk, wherein each chunk corresponds to a range of bytes in the rendition segment, in Block S170. Alternatively, the worker can store a completed copy of the rendition segment in local memory and transfer the completed rendition segment to the rendition cache upon completion of the transcode.

11. Concurrent Streaming

Figure 4A:
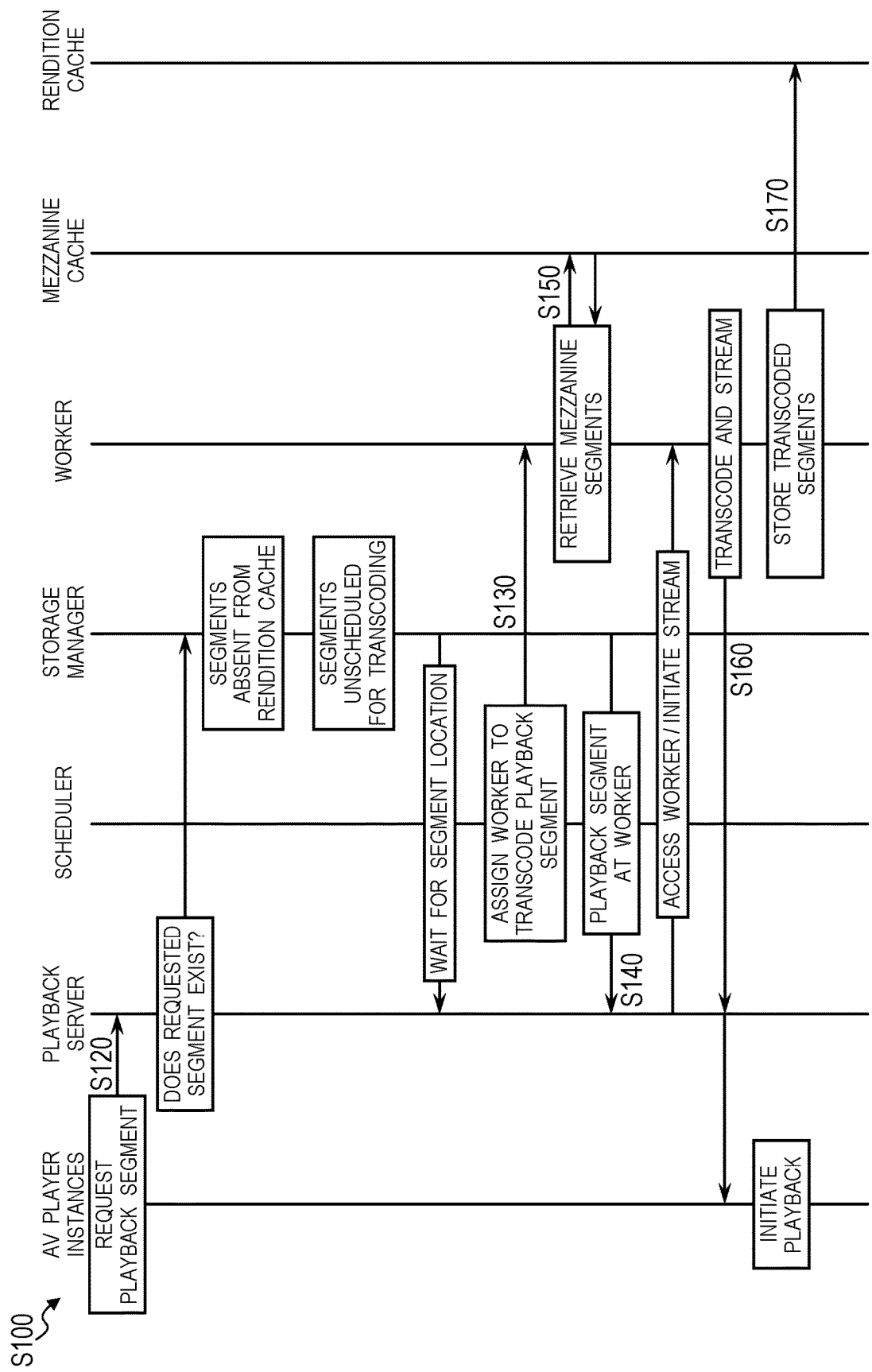
FIG. 4A is a flowchart representation of one variation of the method.

As shown in FIG. 1 and FIG. 4A in Block S160, the computer system can just-in-time transcode a requested playback segment and begin streaming the playback segment within 500 milliseconds, or within a time period such that the AV player instance does not adaptively request a reduced bitrate rendition of the AV file due to latency in the request. Generally, the method S100 accomplishes this by initiating a peer-to-peer stream between the worker and the playback server, which can then distribute the requested AV data to all requesting AV player instances or CDNs.

Thus, the computer system can: transcode a first mezzanine chunk of video data from the mezzanine segment including the initial keyframe to generate a first rendition chunk of the rendition segment in the first rendition; transmit the first rendition chunk of the rendition segment in the first rendition to the first computational device via a peer-to-peer stream; transcode a series of successive mezzanine chunks of video data from the mezzanine segment based on the initial keyframe of the mezzanine segment to generate a series of successive rendition chunks of the rendition segment in the requested rendition; and for each rendition chunk in the series of successive rendition chunks of the rendition segment in the requested rendition and in response to transcoding the rendition chunk, transmit the rendition chunk to the first computational device via the peer-to-peer stream.

Alternatively, the computer system can execute concurrent write and read operations into and out of the rendition cache or within local memory of a worker in the computer system. As a rendition segment corresponding to a requested playback segment is being transcoded from a mezzanine segment (i.e. written to the rendition cache or local memory of a worker), the computer system streams completed chunks of the rendition segment to the requesting AV player. Thus, the computer system can write each chunk of a rendition segment to the local memory of the worker or to the rendition cache, before immediately transmitting the chunk as part of the requested playback segment in response to a chunk request from the playback server. In one implementation, the computer system can store completed chunks in a temporary storage buffer from which the computer system can stream the chunks to an instance of an AV player. However, simultaneous streaming and transcoding from the rendition cache can be executed by the computer system in any other way.

Thus, the computer system transcodes supported renditions of the AV file over time as each rendition is requested by an AV player or CDN as part of a playback segment. Therefore, the playback server spreads the computational load of transcoding rather than transcoding all renditions of the AV file before publishing a stream of the AV file.

In implementation wherein the computer system includes a rendition cache configured to store audio rendition segments separate from video rendition segments, the computer system can concurrently stream audio rendition segments coincident with the requested playback segment from a separate location while just-in-time transcoding video rendition segments coincident with the requested playback segment (or vice versa). Thus, the computer system can conserve computational resources typically utilized to repeatedly transcode audio data into the same rendition audio segments that are paired across multiple video renditions.

11.1 Mid-Transcode Streaming

Generally, if the playback server receives a second request (e.g., from a separate AV player instance or CDN) for a rendition segment and identifies that a request for the same rendition segment has already been received, the computer system can stream chunks corresponding to the requested playback segment directly from the worker in a peer-to-peer stream. More specifically, the playback server can receive the second request and query the storage manager for the location of a rendition segment coincident with the requested playback segment; the storage manager can detect that the rendition segment is not yet present in the rendition cache but is assigned for transcoding at a worker; the storage manager can then transmit the address of the worker to the playback server, which can initiate a peer-to-peer stream with the worker transcoding the segment.

While transcoding the rendition segment, the worker generates an addressable bitstream, in which each byte of the transcoded stream is individually addressable based on corresponding timestamps of the AV file. The computer system can therefore stream bytes corresponding to the playback segment to the requesting AV player via the playback server upon initiation of the peer-to-peer stream.

Thus, the computer system can: receive a second request for a playback segment in a requested rendition. The computer system can also, in response to identifying that the playback segment is being transcoded into the requested rendition: identify the worker transcoding the playback segment via the storage manager; initiate a peer-to-peer stream between the second computational device and the worker; and, at the worker, while transcoding the subset of mezzanine segments into a consecutive subset of rendition segments in the requested rendition and for each rendition segment in the consecutive subset of rendition segments, transmit the rendition segment coinciding with the playback interval to the second computation device via the peer-to-peer stream with the second computational device.

However, the computer system can concurrently store a transcoded AV segment to the rendition cache and stream the playback segment to an AV player in any other way.

11.2 Rendition Cache Streaming

If the rendition segment already exists in the rendition cache, then the computer system streams chunks from the rendition segment directly to the requesting AV player instance from the rendition cache.

In one implementation, the computer system selects rendition segments in supported renditions of the AV file (e.g. the first rendition segment in each supported rendition) in order to preempt requests to stream those rendition segments. Additionally or alternatively, the computer system can transcode the first mezzanine segment into popular rendition formats. In one implementation, the computer system can transcode rendition segments corresponding to a video or image thumbnail of the AV file and transmit a thumbnail image or video to a device.

Thus, the computer system can: receive a second request for a playback segment in the requested rendition from a second computational device. The computer system can also, in response to identifying that the playback segment in the first rendition is stored in the rendition cache: identify a consecutive subset of rendition segments in the rendition cache coinciding with the playback interval in the audio-video file; and, for each rendition segment in the consecutive subset of rendition segments, transmit the rendition segment coinciding with the playback interval to the second computational device.

However, the computer system can initiate just-in-time transcoding or direct streaming in any other way and can perform either just-in-time transcoding or direct streaming for any purpose.

11.3 Preemptive Transcoding

In addition to assigning workers to transcode rendition segments coinciding with playback intervals indicated in playback requests, the computer system can also preemptively assign workers to transcode (e.g., in parallel with the first transcoding worker) mezzanine segments of the AV file into rendition segments that have not yet been requested but may likely be requested in the future. More specifically, in response to receiving a request coinciding with a consecutive subset of rendition segments, the computer system can assign a worker to transcode: subsequent rendition segments in the requested rendition; subsequent rendition segments in an immediately higher rendition; and/or subsequent rendition segments in an immediately lower rendition. Therefore, the computer system can reduce latency for subsequent transcodes and mitigate disruption of streaming content due to connectivity issues between servers and requesting AV instances by preempting requests and, upon receiving those requests, provide a direct stream of the subsequent rendition segments from the rendition cache. Furthermore, by preemptively transcoding higher and lower resolution renditions of subsequent rendition segments, the computer system can anticipate adaptive changes to the requested rendition for a particular request from an AV player instance.

Thus, the computer system can, in response to receiving a request for a playback segment in a requested rendition: identify a subsequent mezzanine segment to the consecutive subset of mezzanine segments (identified in Block S150); and assign a second worker, in response to identifying that the subsequent mezzanine segment in the requested rendition is not stored in the rendition cache and is not assigned for transcoding, to transcode the subsequent mezzanine segment into a subsequent rendition segment in the requested rendition. Additionally, the second worker can just-in-time transcode the subsequent mezzanine segment into the subsequent rendition segment in the requested rendition. Upon receiving a second request for a second playback segment in the requested rendition and, in response to identifying that the subsequent rendition segment in the first rendition is stored in the rendition cache, the computer system can transmit the subsequent rendition segment in the first rendition coinciding with the second playback interval to the first computational device.

Additionally, the computer system can perform the above-mentioned preemptive transcoding process, and instead transcode a higher or lower rendition than the requested rendition in response to the first request. If the AV player instance adapts the bitrate/resolution of the AV file in response to a change in connectivity, then the AV player instance may request the preemptively transcoded rendition segments and the computer system can stream the higher or lower rendition segments to the requesting AV player instance (or CDN).

In one implementation, the computer system can also access historical seeking behavior with AV files of a similar type (e.g., a similar length, content type, visual complexity) and preemptively transcode selective future rendition segments at particular time increments in advance of the requested playback segments. For example, the computer system can assign workers to transcode rendition segments coinciding with timestamps 5, 10, 15, 20, 25, and 30 seconds ahead of the start timestamp of the currently requested playback segment. Therefore, if a user seeks ahead in the AV player instance resulting in a request for the playback segments coinciding with the set of incremental timestamps, then the computer system can directly stream the preemptively transcoded rendition segments to the AV player instance (or CDN).

However, the computer system can preemptively transcode any rendition segment in order to reduce latency for future requests for playback segments.

12. Livestream Variation

Figure 4B:
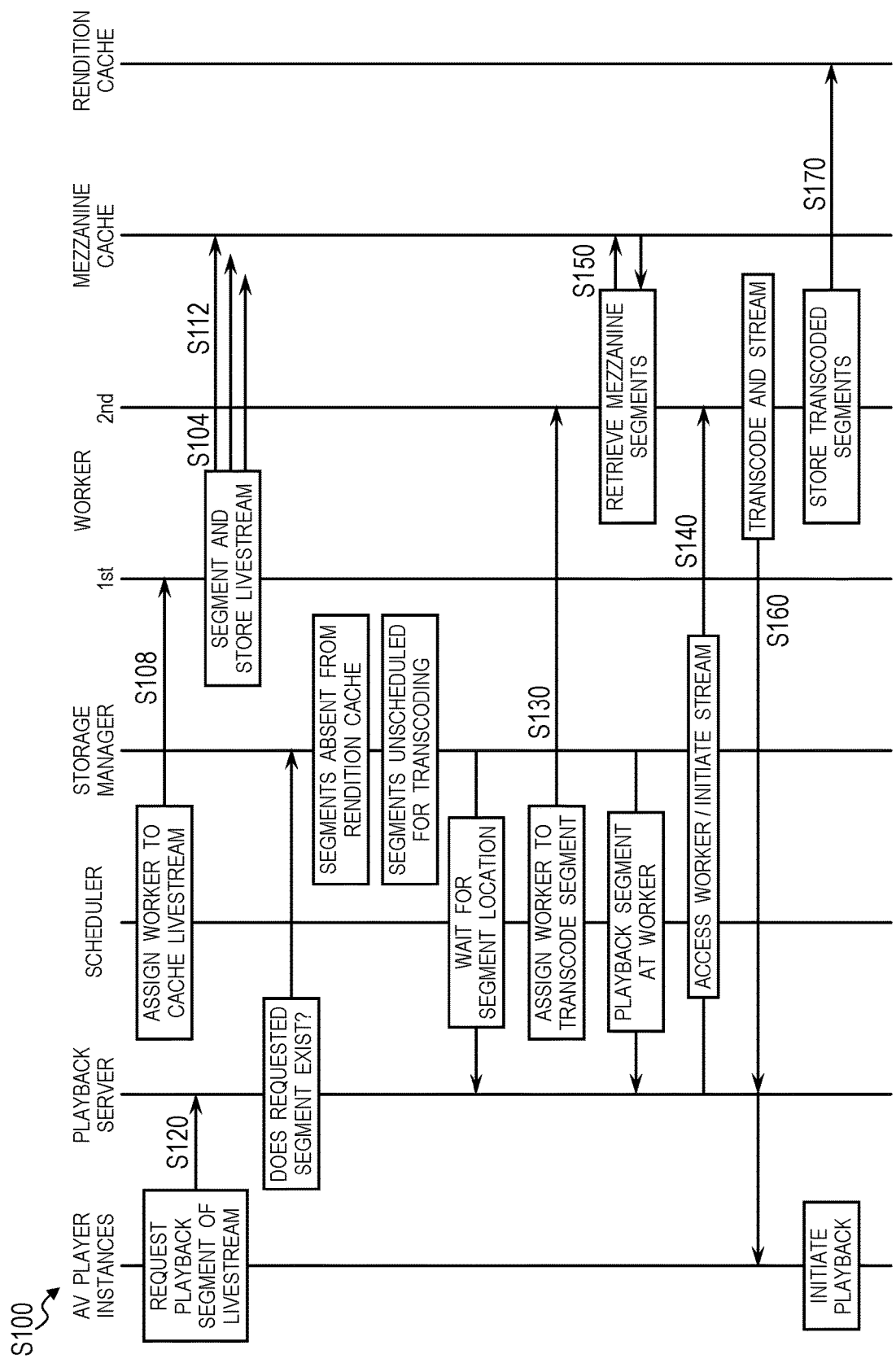
FIG. 4B is a flowchart representation of one variation of the method.

As shown in FIG. 4B, the computer system can also execute just-in-time encoding for serving an AV livestream to a set of AV player instances or CDNs. More specifically, the computer system can receive the AV file as a livestream in Block S106; and assign a first worker to cache mezzanine segments of a livestream as encoded AV data is received at the computer system in Block S108. However, the computer system can delay transcoding these segments into rendition segments in each supported rendition of the livestream until those segments are requested by an AV player instance or CDN. Therefore, the computer system leverages just-in-time transcoding to conserve computational resources transcoding each supported rendition of the livestream before the livestream is requested to be viewed at an AV player instance.

In particular, the computer system can: receive the livestream including a stream of audio-video data; and assign a first worker to cache the stream of audio-video data. The first worker can then, for the duration of the livestream: segment the stream of audio-video data as a set of mezzanine segments, each mezzanine segment in the set of mezzanine segments including a portion of the stream of audio-video data beginning at an initial keyframe and terminating at a terminal keyframe; and cache the set of mezzanine segments in a mezzanine cache.

12.1 Real-Time Stream Evaluation

In addition to caching a set of mezzanine segments of the livestream, the worker assigned to cache the livestream can also evaluate the encoding of the livestream AV data in real-time in order to identify keyframe intervals and, in response to detecting keyframe intervals greater than a maximum keyframe interval, reencode the livestream with new keyframe intervals that are less than a maximum keyframe interval. Therefore, the computer system can continuously calculate keyframe intervals in the livestream until a keyframe interval exceeds a maximum keyframe interval. The computer system can then reencode all incoming AV data of the livestream or can selectively re-encode the mezzanine segment with greater than a maximum keyframe interval duration. Thus, the computer system maintains keyframe intervals in the mezzanine segment of the livestream less than the maximum keyframe interval.

In particular, the computer system can: in response to detecting in the stream of audio-video data keyframe intervals greater than a maximum keyframe interval, re-encode the stream of audio-video data to generate a re-encoded stream of audio-video data, the re-encoded stream of audio-video data defining keyframe intervals less than the maximum keyframe interval; and segment the re-encoded stream of audio-video data as the set of mezzanine segments. Alternatively, the computer system can automatically re-encode the livestream to insert keyframes less than the maximum keyframe interval apart.

12.2 Worker Pre-Allocation

In one implementation, the computer system can preemptively allocate computational resources (e.g., workers) to transcoding tasks in advance of receiving requests for particular rendition segments such that the computer system can reduce the latency of the livestream upon receiving those requests. In particular, the computer system can allocate workers by notifying the storage manager of the worker that will transcode a rendition segment. However, the worker will not begin transcoding until a request for its assigned rendition segment is received at the playback server. In one implementation, the computer system can allocate workers to transcode the first (i.e. initial) rendition segment in each supported rendition of the livestream such that any device requesting to view the livestream from the beginning can experience lower latency. Additionally or alternatively, the system can allocate workers to transcode the most recently received mezzanine segment into each supported rendition of the livestream such that any AV player instance that requests to view the current livestream (e.g., live) can experience lower latency.

Thus, the computer system can: in response to receiving the livestream, allocate a worker to transcode a first mezzanine segment in the set of mezzanine segments of the livestream into a first rendition segment in a particular rendition; receive a request for a playback segment of the livestream in the particular rendition, wherein the second playback segment defines a second playback interval in the livestream coinciding with the first mezzanine segment. The computer system can then, in response to the second playback interval coinciding with the first mezzanine segment: assign the pre-allocated worker to transcode the first mezzanine segment into the first rendition segment in the particular rendition; and initiate a peer-to-peer stream between the pre-allocated worker and the requesting AV player instance, device, (or CDN). The third worker can then just-in-time transcode the first rendition segment in the particular rendition.

Additionally or alternatively, the computer system can perform the above steps and instead allocate a worker to transcode the latest mezzanine segment into a particular rendition. In this implementation, the computer system can continuously update the pre-allocated worker with the address of the latest (i.e. most recent) mezzanine segment of the livestream.

In another implementation, in response to receiving a request for the latest mezzanine segment in a particular rendition, the computer system can pre-allocate workers to transcode mezzanine segments that have not yet been cached by the caching worker of the livestream. Therefore, the computer system can reduce latency in transmitting the stream to AV player instances that are requesting a live version of the stream. Thus, the subsequent pre-allocated worker can, in response to the computer system caching the subsequent mezzanine segment in the mezzanine cache: access the subsequent mezzanine segment from the mezzanine cache; and just-in-time transcode the subsequent mezzanine segment into a subsequent rendition segment in the particular rendition.

Additionally, the computer system can track pre-allocated workers and deallocate the workers upon receiving an indication of a termination of the livestream. Therefore, the computer system can: in response to receiving the livestream allocate a worker to transcode a mezzanine segment in the set of mezzanine segments to a rendition segment in a particular rendition; and in response to receiving an indication of a termination of the livestream, deallocate the third worker from the transcoding task.

However, the computer system can pre-allocate workers in any other way to improve latency in livestream transcoding and viewing.

13. Storage Optimization

The method S100 enables storage optimization methods in the rendition cache. The method S100 can include recording, for subsequent requests, viewing data for the rendition segment; responsive to the viewing data failing to satisfy a set of retention criteria, deleting the rendition segment from the rendition cache; and responsive to receiving a third request for the playback segment from a third audio-video player instance: transcoding the audio-video segment to the rendition of the playback segment to reproduce the rendition segment; and streaming the portion of the rendition segment that coincides with the playback segment to the audio-video player. Generally, just-in-time transcoding enables the computer system to transcode mezzanine segments into requested rendition segments on demand as opposed to in advance and, therefore, allows the computer system to delete rendition segments from the rendition cache while still publishing a stream for the AV file. The computer system can then re-transcode deleted rendition segments if the deleted segments correspond to a requested playback segment.

In one implementation, the computer system records viewing data for each rendition segment. Viewing data can include the total number of requests received for the rendition segment, the number of requests in a specified period of time, the time of the last request for the rendition segment, or any of the above viewing data for sequentially adjacent or otherwise related (e.g. the same rendition encoding) rendition segments. Additionally or alternatively, the method S100 can include using a statistical model to predict future viewing data for the rendition segment. However, viewing data can be collected in any other way.

In one implementation, the computer system can periodically evaluate a set of retention criteria for each rendition segment to determine whether the rendition segment should remain in the rendition cache. The retention criteria can include a minimum number of requests for a rendition segment received within a time interval, a maximum amount of time since the last request for a rendition segment, a minimum frequency of requests within a recent period of time, or any other function of the viewing data for a rendition segment. If a rendition segment does not satisfy the retention criteria, the computer system can remove the rendition segment from the rendition cache.

In one implementation, the computer system can delete entire renditions of an AV file based on comparative viewing data between renditions of the AV file. For example, if one rendition is receiving very few views compared to another, the computer system can delete all of the rendition segments of that rendition. Additionally or alternatively, the computer system can delete rendition segments based on comparative viewing data between temporally different rendition segments within the same rendition. For example, the computer system can delete a rendition segment containing movie credits or an otherwise less frequently viewed segment of video because the rendition segment has received less than a minimum number of views in the last week. In another implementation, the computer system evaluates a probabilistic cost model comparing the cost of storing a rendition segment with the computational cost of re-transcoding it.

Thus, the computer system can record, for subsequent requests, viewing data for the playback segment. The computer system can then, in response to the viewing data of the playback segment failing to satisfy a set of retention criteria: identify a consecutive subset of rendition segments in the rendition cache coinciding with the playback interval; and delete the consecutive subset of rendition segments in the first rendition from the rendition cache. The computer system can then, in response to receiving another request for the playback segment, execute Blocks of the method S100 to re-transcode the consecutive subset of rendition segments in the requested rendition.

Additionally or alternatively, the computer system can record, for subsequent requests, viewing data associated with a particular rendition. The computer system can then, in response to the viewing data associated with the particular rendition failing to satisfy a set of retention criteria for the particular rendition: identify a set of rendition segments in the particular rendition in the rendition cache; and delete the set of rendition segments in the particular rendition from the rendition cache.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for streaming an audio-video file comprising:
   segmenting an audio-video file into a set of mezzanine segments, each mezzanine segment in the set of mezzanine segments comprising a portion of the audio-video file;
   generating a manifest file for the audio-video file, the manifest file representing:
      a first rendition of the audio-video file characterized by a first bitrate and a first resolution; and
      a second rendition of the audio-video file characterized by a second bitrate less than the first bitrate and a second resolution less than the first resolution;
   prior to transcoding of the audio-video file into the first rendition and prior to transcoding of the audio-video file into the second rendition, publishing the manifest file for distribution to an audio-video player;
   in response to receiving a first request for a playback segment of the audio-video file in the first rendition from the audio-video player:
      initiating transcoding of the playback segment, in the set of mezzanine segments, into the first rendition by a first worker;
      initiating a first stream of the playback segment from the first worker to the audio-video player; and
      storing the playback segment in the first rendition in a rendition cache.

2. The method of claim 1, wherein initiating transcoding of the playback segment in the set of mezzanine segments into the first rendition by the first worker comprises:
   in response to identifying absence of the playback segment in the first rendition from the rendition cache and in response to identifying absence of an assignment to transcode the playback segment in the first rendition:
      identifying a first subset of mezzanine segments, in the set of mezzanine segments, corresponding to the playback segment; and
      at the first worker, transcoding the first subset of mezzanine segments into the playback segment in the first rendition.

3. The method of claim 1, further comprising:
   in response to receiving the first request for the playback segment in the first rendition:
      identifying a second subset of mezzanine segments, in the set of mezzanine segments, corresponding to a subsequent segment succeeding the playback segment in the audio-video file;
      initiating transcoding of the second subset of mezzanine segments into the subsequent segment in the second rendition by a second worker; and
      storing the subsequent segment in the second rendition in the rendition cache; and
   in response to receiving a second request for the subsequent segment in the second rendition from the audio-video player:
      in response to detecting presence of the subsequent segment in the second rendition stored in the rendition cache, transmitting the subsequent segment in the second rendition from the rendition cache to the audio-video player.

4. The method of claim 1, further comprising, in response to receiving the first request for the playback segment in the first rendition:
   identifying a second subset of mezzanine segments, in the set of mezzanine segments, corresponding to a subsequent segment succeeding the playback segment in the audio-video file;
   initiating transcoding of the second subset of mezzanine segments into the subsequent segment in the first rendition by a second worker;
   storing the subsequent segment in the first rendition in the rendition cache; and
   in response to detecting deteriorating viewing conditions of the playback segment at the audio-video player:

initiating transcoding of the second subset of mezzanine segments into the subsequent segment in the second rendition by a third worker; and
storing the subsequent segment in the second rendition in a second rendition cache.

5. The method of claim 1, further comprising:
receiving a second request for the playback segment in the first rendition from a second audio-video player; and
in response to detecting presence of the playback segment in the first rendition in the rendition cache, transmitting the playback segment in the first rendition from the rendition cache to the second audio-video player.

6. The method of claim 1, further comprising:
receiving a second request for the playback segment in the first rendition from a second audio-video player; and
in response to detecting ongoing transcoding of the playback segment into the first rendition by the first worker:
  initiating a second stream of the playback segment from the first worker to the second audio-video player.

7. The method of claim 1, further comprising:
in response to receiving the first request for the playback segment in the first rendition:
  identifying a second subset of mezzanine segments, in the set of mezzanine segments, corresponding to a subsequent segment succeeding the playback segment in the audio-video file;
  initiating transcoding of the second subset of mezzanine segments into the subsequent segment in the first rendition by a second worker; and
  storing the subsequent segment in the first rendition in the rendition cache; and
in response to receiving a second request for the subsequent segment in the first rendition from the audio-video player, transmitting the subsequent segment in the first rendition from the rendition cache to the audio-video player.

8. The method of claim 1, further comprising:
accessing a quantity of requests for the playback segment in the first rendition within a population of video players during a time interval; and
in response to the quantity of requests for the playback segment in the first rendition falling below a threshold retention frequency during the time interval, deleting the playback segment in the first rendition from the rendition cache.

9. The method of claim 1, wherein segmenting the audio-video file into the set of mezzanine segments comprises:
identifying a set of keyframe timestamps in the audio-video file; and
segmenting the audio-video file into the set of mezzanine segments based on the set of keyframe timestamps.

10. The method of claim 1, further comprising:
accessing a quantity of viewing instances of the first rendition within a population of video players during a time interval; and
in response to the quantity of viewing instances of the first rendition during the time interval falling below a threshold retention frequency, deleting the playback segment in the first rendition from the rendition cache.

11. A method for streaming an audio-video file comprising:
segmenting the audio-video file into a set of mezzanine segments, each mezzanine segment in the set of mezzanine segments comprising a portion of the audio-video file;
receiving a first request for a playback segment in a first rendition from an audio-video player;
in response to receiving the first request for the playback segment in the first rendition from the audio-video player, in response to identifying absence of the playback segment in the first rendition from a rendition cache, and in response to identifying absence of an assignment to transcode the playback segment in the first rendition:
  assigning transcoding of the playback segment, in the set of mezzanine segments, into the first rendition to a first worker;
  initiating a stream for the playback segment from the first worker to the audio-video player;
  storing the playback segment in the first rendition in the rendition cache;
  anticipating a second request from the audio-video player for a subsequent segment in a second rendition, the subsequent segment succeeding the playback segment in the set of mezzanine segments, the second rendition defining a second bitrate and a second resolution different from a first bitrate and a first resolution of the first rendition;
  assigning transcoding of the subsequent segment into the second rendition to a second worker; and
  storing the subsequent segment in the second rendition in the rendition cache; and
in response to receiving the second request for the subsequent segment in the second rendition from the audio-video player, initiating transmission of the subsequent segment in the second rendition from the rendition cache to the audio-video player.

12. The method of claim 11:
.wherein anticipating the second request from the audio-video player for the subsequent segment in the second rendition comprises anticipating the second request from the audio-video player for the subsequent segment in the second rendition in response to detecting deterioration of viewing conditions at the audio-video player; and
wherein assigning transcoding of the subsequent segment into the second rendition to the second worker comprises assigning transcoding of the subsequent segment into the second rendition to the second worker, the second rendition of the audio-video file characterized by the second bitrate less than the first bitrate and the second resolution less than the first resolution.

13. The method of claim 11:
further comprising:
  generating a manifest file for the audio-video file representing:
    the first rendition of the audio-video file; and
    the second rendition of the audio-video file; and
  prior to transcoding of the audio-video file into the first rendition and prior to transcoding of the audio-video file into the second rendition, publishing the manifest file for distribution to the audio-video player; and
wherein receiving the first request for the playback segment in the first rendition from the audio-video player comprises receiving the first request for the playback segment in the first rendition from the audio-video player based on the manifest file.

14. The method of claim 11:
wherein anticipating the second request from the audio-video player for the subsequent segment in the second rendition comprises anticipating the second request from the audio-video player for the subsequent segment in the second rendition in response to detecting improvement of viewing conditions at the audio-video player; and wherein assigning transcoding of the subsequent segment into the second rendition to the second worker comprises assigning transcoding of the subsequent segment into the second rendition to the second worker, the second rendition of the audio-video file characterized by the second bitrate higher than the first bitrate and the second resolution higher than the first resolution.

15. The method of claim 11, further comprising:

accessing a quantity of requests for the playback segment in the first rendition within a population of video players during a time interval; and in response to the quantity of requests for the playback segment in the first rendition falling below a threshold retention frequency during the time interval, deleting the playback segment in the first rendition from the rendition cache.

16. The method of claim 11, further comprising:

receiving a third request for the playback segment in the first rendition from a second audio-video player; and in response to detecting presence of the playback segment in the first rendition in the rendition cache, transmitting the playback segment in the first rendition from the rendition cache to the second audio-video player.

17. The method of claim 11, further comprising:

receiving a third request for the playback segment in the first rendition from a second audio-video player; and in response to detecting ongoing transcoding of the playback segment into the first rendition:

identifying the first worker transcoding the playback segment; and initiating a second stream for the playback segment from the first worker to the second audio-video player.

18. The method of claim 11, further comprising:

in response to receiving the first request for the playback segment in the first rendition:

identifying a second subset of mezzanine segments, in the set of mezzanine segments, corresponding to the subsequent segment succeeding the playback segment in the audio-video file;

assigning transcoding of the second subset of mezzanine segments into the subsequent segment into the first rendition to a third worker; and storing the subsequent segment in the first rendition in the rendition cache; and in response to receiving a third request for the subsequent segment in the first rendition from the audio-video player, transmitting the subsequent segment in the first rendition from the rendition cache to the audio-video player.

19. The method of claim 11, wherein segmenting the audio-video file into the set of mezzanine segments comprises:

identifying a set of keyframe timestamps in the audio-video file; and segmenting the audio-video file into the set of mezzanine segments based on the set of keyframe timestamps.

20. The method of claim 11, further comprising:

accessing a quantity of viewing instances of the first rendition within a population of video players during a time interval; and in response to the quantity of viewing instances of the first rendition during the time interval falling below a threshold retention frequency, deleting the playback segment in the first rendition from the rendition cache.

* * * * *